United States Patent Office 3,695,841
Patented Oct. 3, 1972

3,695,841
PURIFYING HYDROGEN
Guenter Zirker, 78 Schelmenzeile; Walter Sanne, 24 Ungsteiner Strasse; Kurt Pilch, 56 Rheinrugenstrasse; and Gerhard Schulze, 46 Leuschnerstrasse, all of 6700 Ludwigshafen, Germany
No Drawing. Filed July 29, 1970, Ser. No. 58,991
Int. Cl. C01b 1/30
U.S. Cl. 423—651    5 Claims

ABSTRACT OF THE DISCLOSURE

Hydrogen which has been obtained in the dehydrogenation of hydrocarbons or their derivatives is purified by passing it at elevated temperature over a supported catalyst which contains as the active ingredient nickel and as the carrier aluminum oxide, magnesium oxide or a mixture of the two.

---

In the dehydrogenation of hydrocarbons and their derivatives, hydrogen is obtained which is contaminated by these hydrocarbons or their derivatives and any decomposition products formed. Because of these impurities, the hydrogen cannot be used immediately but needs purification. In principle it should be possible to purify hydrogen having such impurities by mixing it with steam and treating it at elevated temperatures in the presence of catalysts containing nickel, but carbon monoxide and carbon dioxide would be formed and would have to be removed again from the hydrogen in a further operation because they would be troublesome in subsequent operations. In order to be able to carry out this reaction satisfactorily and to prevent cracking and polymerizations by which the catalyst is coated with carbon or resinous products and rapidly inactivated, steam has to be present all the time. Purification of hydrogen by this method is expensive and therefore impracticable. Non-catalytic methods of purifying hydrogen are also known in which the said impurities are removed by physical methods, for example by means of molecular sieves. These are batch processes however and require expensive equipment so that this also is not suitable for the purification of hydrogen.

The object of the present invention is to provide a simple process by means of which hydrogen which has been obtained by dehydrogenation of hydrocarbons and their derivatives is purified from higher hydrocarbons or hydrocarbon derivatives contained therein.

This object is achieved by passing the hydrogen at an elevated temperature over a catalyst comprising nickel as the active ingredient supported on aluminum oxide and/or magnesium oxide.

In the process according to the invention is it possible to degrade the higher hydrocarbons and their derivatives contained in the hydrogen to methane which does not interfere with the further use of the hydrogen. It is surprising that no cracking or polymerization reactions take place in the treatment although the purification of the hydrogen is carried out practically in the absence of steam, i.e. the hydrogen itself contains practically no steam apart from slight contamination and no steam is added during the reaction.

The essential feature is the composition of the catalyst which according to the invention contains aluminum oxide and/or magnesium oxide as the carrier.

The two oxides may either be used as such or particularly advantageously may be mixed together, and mixtures have proved to be particularly favorable which contain from 30 to 80% by weight of magnesium oxide based on the carrier as a whole.

The catalysts according to the invention generally have a nickel content of from 20 to 70%, preferably from 15 to 50%, calculated as nickel oxide (NiO). Oxides having a high proportion of pores which have been obtained by dehydration of hydrated oxides, for example boehmite, have proved to be suitable as aluminum oxides. The dehydration of these hydrated oxides may be carried out prior to the production of the catalyst or may be carried out in the finished catalyst after the nickel compounds have been added. In addition to the said components, the catalysts may contain compounds which are known as stabilizers or activators for nickel catalysts, such as chromium, iron or zinc compounds.

Catalysts which have been obtained by precipitating sparingly soluble nickel compounds such as nickel hydroxide or nickel carbonate which are decomposable into nickel oxide onto magnesium oxide or aluminum oxide or particularly on an intimate mixture of these oxides have proved to be particularly suitable.

Precipitation of the compounds decomposable into nickel oxide onto the aluminum oxide and/or magnesium oxide may be carried out by placing these oxides in sodium carbonate solution or caustic alkali solution and pouring in an aqueous nickel salt solution, for example nickel sulfate or nickel chloride, or by placing aluminum oxide or magnesium oxide in water and pouring in at the same time (a) a nickel salt solution and (b) a sodium carbonate solution or an alkali solution. A pH range of from 7 to 9 should be maintained. Precipitation is generally carried out at elevated temperature and a precipitation temperature of from 45° to 90° C. has proved to be very suitable. The precipitates obtained are washed, dried, optionally calcined and shaped by known methods. The catalysts prepared in this way are reduced before or during use by passing a gas containing hydrogen, for example the gas which is to be purified itself, over the catalysts at temperatures of from 150° to 400° C.

The hydrogen to be purified is passed over the catalyst at atmospheric or superatmospheric pressure, for example up to 20 atmospheres, at flow velocities of for example 500 to 5000 liters of gas per liter of catalyst per hour. It is advantageous to use temperatures of from 150° to 500° C., preferably of from 200° to 350° C. The exact conditions depend on the amount and type of impurities to be removed.

It is possible by the process according to the invention to convert higher hydrocarbons and their derivatives contained as impurities in hydrogen continuously in a simple way into innocuous methane in continuous operation and without inactivation of the catalyst by coating it with carbon black, resins or the like. It is therefore possible to convert the gas useful prior to purification at most for heating purposes into valuable synthesis grade hydrogen which can be used for example for hydrogenations without further treatment. The nature of the hydrocarbons present as impurities may vary widely according to the source of the hydrogen. The process is well suited for the purification of hydrogen which stems for example from the dehydrogenation of cyclohexanol into cyclohexanone or dehydrogenation of ethylbenzene into styrene and which consequently contains mainly aromatic compounds or cycloaliphatic compounds, for example benzene, ethylbenzene, cyclohexanol and cyclohexanone. Naturally, hydrogen which contains chiefly aliphatic hydrocarbons as impurities and which stems for example from the dehydrogenation of propane into propylene may also be purified by the process according to the invention.

The following examples illustrate the invention. The parts specified in the examples are by weight and the parts per million (p.p.m.) are by volume.

EXAMPLE 1

Hydrogen (which contains as impurities: 0.13% by volume of carbon monoxide, 230 p.p.m. of ethylene, 15 p.p.m. of butene and butadiene, 0.14% by volume of cyclohexanone, 200 p.p.m. of cyclohexene and 500 p.p.m. of cyclohexanol) is heated to 330° C. and passed at a flow velocity of 1000 liters of gas per liter of catalyst per hour over the catalyst described below. After the hydrogen has left the reaction zone and has been cooled it contains only the following impurities some of which can no longer be detected: less than 1 p.p.m. of carbon monoxide, less than 1 p.p.m. of ethylene, less than 1 p.p.m. of butene and butadiene, less than 20 p.p.m. of cyclohexanol, less than 20 p.p.m. of cyclohexanone and less than 5 p.p.m. of cyclohexene. The reacted components have been degraded into methane which is not troublesome in the further use of the hydrogen.

The catalyst is prepared as follows: a solution of 40 parts of calcined sodium carbonate in 500 parts of water and 111.4 parts of a nickel nitrate solution (prepared by dissolving metallic nickel in 45% by weight nitric acid and having a nickel content of 13.5% by weight and a density of 1.496) are slowly introduced simultaneously at 70° C. while stirring into a suspension of 15 parts of hydrated aluminum oxide (boehmite) calculated as $Al_2O_3$ and 15 parts of magnesium oxide in 500 parts of water. The whole is stirred for another fifteen minutes, a pH of 7.5 being set up. The precipitate is filtered off, washed until nitrate is no longer detectable in the wash water and dried at 120° C. It is then calcined for six hours at 350° C. and the material is shaped into 5 mm. tablets with an addition of 2% by weight of graphite. The catalyst is then treated for four hours at 350° C. with the abovementioned gas to be purified in order to reduce it.

EXAMPLE 2

Hydrogen (which contains as impurities: 750 p.p.m. of cyclohexanone, 200 p.p.m. of cyclohexanol, 138 p.p.m. of cyclohexene, 20 p.p.m. of benzene and 150 p.p.m. of ethylene) is passed at a flow velocity of 750 liters (STP) of gas per liter of catalyst per hour at a pressure of 7 atmospheres and a temperature of 250° C. over the catalyst described below. After the catalytic reaction, the higher hydrocarbons have been degraded to methane to below the detectability limits (a few p.p.m. depending on the component).

To prepare the catalyst, 111 parts of the nickel nitrate solution specified in Example 1 is slowly added at 80° C. to a suspension of 20 parts of magnesium oxide and 10 parts of aluminum oxide in a solution of 40 parts of calcined sodium carbonate and 1000 parts of water while stirring. After having been stirred for one hour, the product is suction filtered, washed and the catalyst further processed as described in Example 1.

We claim:

1. A process for purifying hydrogen which has been obtained from the dehydrogenation of (1) cyclohexanol to cyclohexanone; (2) ethylbenzene to styrene; or (3) propane to propylene and which contains as contaminants (a) the starting material; (b) dehydrogenation products of the starting material and/or cracked products of the starting material which essentially comprises: passing said hydrogen and said contaminants at a temperature of 150° to 500° C. over a supported catalyst which contains nickel as the active material and aluminum oxide and/or magnesium oxide as the carrier, whereby said contaminants are degraded to methane.

2. A process as in claim 1 carried out at a temperature of 200° to 350° C.

3. A process as in claim 1 wherein the carrier consists of a mixture of aluminum oxide and magnesium oxide which contains from 30 to 80% by weight of magnesium oxide with reference to the whole carrier.

4. A process as in claim 1 wherein the supported catalyst contains from 20 to 70% of nickel (calculated as NiO) with reference to the whole of the supported catalyst.

5. A process as in claim 1 wherein the flow velocity of the hydrogen is from 500 to 5000 liters of gas per liter of catalyst per hour.

References Cited

UNITED STATES PATENTS

| | | | |
|---|---|---|---|
| 1,812,527 | 6/1931 | Gross et al. | 23—210 |
| 2,229,199 | 1/1941 | Voorhies | 23—212 X |
| 3,363,988 | 1/1968 | Hayes | 23—212 R |
| 3,290,406 | 12/1966 | Pfefferle | 23—212 R X |

FOREIGN PATENTS

| | | | |
|---|---|---|---|
| 17,487/69 | 8/1969 | Japan | 23—212 |

EDWARD STERN, Primary Examiner

PO-1050
(5/69)

UNITED STATES PATENT OFFICE
CERTIFICATE OF CORRECTION

Patent No. 3,695,841              Dated October 3, 1972

Inventor(s)  Zirker et al

It is certified that error appears in the above-identified patent and that said Letters Patent are hereby corrected as shown below:

Column 1, after line 6, insert -- assignors to Badische Anilin &- Soda-Fabrik Aktiengesellschaft, Ludwigshafen am Rhein, Germany --

Signed and sealed this 13th day of March 1973.

(SEAL)
Attest:

EDWARD M. FLETCHER, JR.                    ROBERT GOTTSCHALK
Attesting Officer                          Commissioner of Patents